US008442006B2

(12) United States Patent
Haddad et al.

(10) Patent No.: US 8,442,006 B2
(45) Date of Patent: May 14, 2013

(54) WIRELESS LAN MOBILITY

(75) Inventors: Wassim Haddad, San Jose, CA (US);
Karl Norrman, Stockholm (SE)

(73) Assignee: Telefonaktiebolaget LM Ericsson,
Stockholm (SE)

( * ) Notice: Subject to any disclaimer, the term of this patent is extended or adjusted under 35 U.S.C. 154(b) by 296 days.

(21) Appl. No.: 12/743,694

(22) PCT Filed: Nov. 23, 2007

(86) PCT No.: PCT/EP2007/062763
§ 371 (c)(1),
(2), (4) Date: May 28, 2010

(87) PCT Pub. No.: WO2009/065447
PCT Pub. Date: May 28, 2009

(65) Prior Publication Data
US 2010/0284368 A1 Nov. 11, 2010

(51) Int. Cl.
*H04W 4/00* (2009.01)
(52) U.S. Cl.
USPC ........................................................ 370/331
(58) Field of Classification Search .................. 370/203,
370/204–215, 216–228, 229–240, 241–253,
370/254–271, 310–337, 338–350, 351–394,
370/395.1, 395.53, 412–421, 395.3, 395.4,
370/395.41, 395.42, 395.5, 395.52, 431–457,
370/458–463, 464–497, 498–522, 523–520,
370/521–529
See application file for complete search history.

(56) References Cited

U.S. PATENT DOCUMENTS

| | | | |
|---|---|---|---|
| 2004/0078598 A1 * | 4/2004 | Barber et al. | 713/201 |
| 2004/0184422 A1 * | 9/2004 | Shaheen | 370/331 |
| 2004/0240412 A1 * | 12/2004 | Winget | 370/331 |
| 2004/0242228 A1 * | 12/2004 | Lee et al. | 455/432.1 |
| 2005/0117524 A1 * | 6/2005 | Lee et al. | 370/254 |
| 2005/0143065 A1 * | 6/2005 | Pathan et al. | 455/432.1 |
| 2006/0140150 A1 * | 6/2006 | Olvera-Hernandez et al. | 370/331 |
| 2006/0200678 A1 * | 9/2006 | Yamada et al. | 713/182 |
| 2007/0153739 A1 * | 7/2007 | Zheng | 370/331 |

FOREIGN PATENT DOCUMENTS
JP  2007194848 A  8/2007

OTHER PUBLICATIONS

Mishra, A. et al. "An Empirical Analysis of the IEEE 802.11 MAC Layer Handoff Process." Computer Communication Review, New York, NY, US, vol. 33, No. 2, Apr. 2003, pp. 93-102.

* cited by examiner

*Primary Examiner* — Jung-Jen Liu
(74) *Attorney, Agent, or Firm* — Coats & Bennett, P.L.L.C.

(57) ABSTRACT

A method of performing hand-off of a Mobile Node from a previous Access Point to a new Access Point within a WLAN domain, where the previous and new Access Points are connected respectively to previous and new Access Routers. The method comprises, following a MAC authentication exchange between the Mobile Node and the new Access Point, sending a MAC Reassociation Request from the Mobile Node to the New Access Point, forwarding said Reassociation Request to said new Access Router, and sending the Reassociation Request from said new Access Router to said previous Access Router within an IP hand-off request, and authenticating the Reassociation Request at the previous Access Router and initiating the tunnelling of IP packets received at the previous Access Router and destined for said Mobile Node, towards said new Access Router.

20 Claims, 5 Drawing Sheets

WIRELESS LAN MOBILITY

TECHNICAL FIELD

The present invention relates to a method and apparatus for facilitating the mobility of user terminals within a Wireless Local Area Network.

BACKGROUND

Wi-Fi is an example implementation of a Wireless Local Area Network (WLAN) and is based upon the IEEE 802.11 series of protocols. Wi-Fi and other WLAN implementations allow mobile devices equipped with a wireless adaptor to "attach" to wireless Access Points (APs). In order to allow wireless devices to connect to the Internet, APs are in turn connected to Access Routers (ARs) which provide IP routing, Network Address Translation (NAT), and DNS forwarding. In a typical domestic scenario, a WLAN network might consist only of a single wireless AP connected to a single AR. However, within for example a corporate environment, multiple APs may be deployed, connected to one or more ARs. Indeed, a single WLAN network might extend to cover an entire town or city, with many hundreds of wireless APs and multiple ARs. A WLAN 1 network comprising multiple APs 2 and multiple ARs 3 is illustrated schematically in FIG. 1, together with an example wireless terminal 4.

Whilst directed to mobile users, WLANs have traditionally been used to allow Internet access from substantially static users. For example, a user may browse the web using his or her laptop whilst sitting in a railway station or airport terminal. As such, the ability to roam within and between WLAN networks has not been a high priority. This is changing with the introduction of new services such as Voice over IP (VoIP) and multimedia applications (including multimedia calls and IPTV) which are time sensitive and which require a smooth and fast handoff between APs.

Within a WLAN, a Media Access Control (MAC) protocol is used to provide addressing between wireless devices and APs. APs and wireless devices are allocated essentially fixed and unique MAC addresses (within the global MAC address space). The MAC protocol also provides for a Service Set Identifier (SSID) which uniquely identifies a given network. All messages sent between the APs of a WLAN and the attached wireless devices contain (within the MAC headers) a source MAC address, a destination MAC address, and the SSID of the WLAN.

FIG. 2 shows an exchange of signalling associated with a wireless device (or mobile node (MN)) attaching to a WLAN via an AP, assuming that the MN is not currently attached to another AP. According to the 802.11 protocols, the MN sends a probe message on each frequency channel of which it is aware. It must wait a predefined period (or even extended period) between probe messages to receive a probe response from any AP within in range. After all of the channels have been probed, the MN selects that AP from which the strongest signal was received, and sends to that AP (using the AP's MAC address contained within the probe response) an authentication message. The AP carries out a weak authentication on the MN and returns an authentication response.

Following the authentication exchange, the MN sends an association message to the AP. The purpose of this message is to cause the AP to install into its database the MAC address of the MN. When the AP receives a data packet from an upstream AR, the AP uses the database to determine (based upon the destination MAC address of the packet) whether the packet is destined for a MN which it is serving, and therefore whether the AP should broadcast the packet. After updating its database, the AP sends an authentication response message to the MN.

At this point MAC attachment has been completed. It is now necessary for the MN to "attach" at the IP level. This process is initiated by the MN sending to the AP a router solicitation message (RtSol). The AP forwards this message on to the AR which responds with a router advertisement message (RtAdv) containing the IPv6 address prefix to be used by the MN. [Alternatively, if the AR is advertising its prefix via multicast RtAdv messages sent periodically on the link, there is no need for the MN to send a RtSol message.] The MN then determines for itself the Interface Identifier (II) part of the IP address in order to construct a complete address and performs a "uniqueness" test by advertising the address on the local link. The AR maintains a mapping between the MAC address of the MN and the allocation IPv6 address. Subsequently, when the AR receives a packet having the allocated IPv6 address as its destination address, the AR identifies the MAC address of the MN and includes this in a MAC header. The AR also identifies the correct link over which to send the packet (towards the AP), and sends the packet over that link. As described above, the AP uses its own database to determine whether it should broadcast a received packet over the local wireless link.

In order to facilitate the introduction of time sensitive services such as VoIP, it is necessary to enable the handoff of wireless devices at least between APs of a WLAN and preferably also between WLAN networks and WLAN networks and other networks, e.g. 3GPP cellular networks. In the case of an intra-WLAN handover, it is necessary to firstly enable handoff at the MAC layer. IEEE 802.11 specifies the procedure involved. The procedure is illustrated by the signalling flow of FIG. 3 and is broadly similar to that associated with initial attachment to an AP and illustrated in FIG. 2. Typically, when the strength of the signal received from a current AP, referred to hereinafter as the previous AP or pAP, falls below some predefined threshold, the MN repeats the probe exchange in order to identify a new AP (nAP) which is within range. The MN learns from the probe response the MAC address of the nAP, and performs the authentication exchange with the nAP.

The MN then sends a reassociation or rea request to the nAP. This differs from the association message (FIG. 2) in that it contains an identity, i.e. MAC address of the pAP. Upon receipt of the rea, the nAP must first of all confirm with the pAP that it is allowed to accept handoff of the MN, and must then instruct the pAP to remove the MN (MAC address) from its association table. This exchange between the pAP and the nAP requires implementation of an inter AP protocol (IAPP). IAPP protocols are proprietary, and no standardised protocol exists at this time.

Following completion of the MAC handoff (involving as it does the probe delay, authentication delay, and reassociation delay), it is still necessary to perform the IP attach process whereby the MN obtains a new IPv6 address from the nAR. Of course, if the AR to which the nAP is attached turns out to be the same AR to which the pAP is attached, the MN will discover this from the IPv6 address prefix contained in the RtAdv message received from the nAP. In this case, existing sessions can be continued. However, if the AR has changed, existing sessions will be dropped in the absence of a suitable mobility protocol.

By itself, this IP attach procedure provides no mechanism for causing packets directed to a pAR to be tunnelled from that pAR to the nAR. This is important otherwise packets will be dropped until such time as a Correspondent Node has been updated with the MNs new IPv6 address.

Mobile IP is an IETF standard communication protocol designed to allow mobile devices to move within and between access networks whilst maintaining a fixed IP address, thus overcoming the problem identified in the previous paragraph. It relies upon the allocation of a fixed home IP address (HoA) to a user, this address belonging to and identifying the user's home network. When the user roams into a visited network, the visited network allocates a care-of-address (CoA) to the user. This CoA is registered at a Home Agent (HA) within the user's home network, where it is mapped to the HoA. As the user moves, his CoA may change. The HA is updated with the new CoA(s) as the user moves, i.e. by the sending of a Location Update to the HA. A Correspondent Node (CN) will use the HoA as the destination address for the roaming user. Packets are therefore routed from the CN to the user through the home network (unless route optimisation is employed, but this is not considered further here).

In the case of a mobile aware wireless device, a mobile IP layer is introduced into the protocol stack at the device, and is responsible for updating the user's HA with the current CoA. At the application layer, applications are only aware of the HoA. For incoming IP packets, the mobile IP layer substitutes the HoA for the CoA in the destination field before forwarding the packets to the higher layers. For outgoing packets no substitution is required. It has been recognised however that this solution cannot be applied to legacy terminals which do not implement the mobile IP protocol. A solution known as proxy mobile IP has therefore been proposed (also by the IETF) and introduces a new network entity known as the Mobility Access Gateway (MAG), previously referred to as the Proxy Mobile Agent. The MAG handles mobility signalling on behalf of mobile devices and, in particular, is responsible for updating a user's HA with the current CoA. In the case of a WLAN, the MAG is implemented within the AR, as it is the AR which is responsible for allocating (global) IP addresses to wireless devices.

Where a MN has been handed-off from an old to a new AR, one of the new AR's roles (as MAG) is likely to be that of sending a Fast Binding Update message to the old AR. Upon receipt and validation of that message, the old AR will begin tunnelling packets that it receives, addressed to the old CoA, to the new AR. Such packets will be received by the old AR until such time as the MN's HA has been updated with the new CoA.

It will be appreciated that the handoff procedures described above are unlikely to allow users to experience the seamless provision of services to which they have become accustomed, e.g. through use of traditional cellular telephone networks, due in part to the need to complete the MAC layer authentication and association phases before IP mobility procedures can be initiated (and tunnelling of packets between the old and the new ARs can begin). It is desirable to try to introduce further measures to optimise WLAN handoff procedures. The scope for changing the existing 802.11 protocols is much restricted however. For example, it is unlikely that it will be possible to change the message formats (i.e. MAC header) exchanged between the mobile node and the AP, or the highly time consuming probe procedure. Any new solutions must take account of these restrictions.

SUMMARY

It is an object of the present invention to provide a fast and efficient mechanism for handing-off a Mobile Node between two Access Points of the same WLAN domain. This and other objects are achieved by distributing an authentication token between Access Routers of the WLAN domain, allowing early MAC hand-off authentication to take place and thereby allowing tunnelling of IP packets between an old and a new Access Router to occur at an early stage.

According to a first aspect of the present invention there is provided a method of performing hand-off of a Mobile Node from a previous Access Point to a new Access Point within a WLAN domain, where the previous and new Access Points are connected respectively to previous and new Access Routers. The method comprises, following a MAC authentication exchange between the Mobile Node and the new Access Point, sending a MAC Reassociation Request from the Mobile Node to the New Access Point, forwarding said Reassociation Request to said new Access Router, and sending the Reassociation Request from said new Access Router to said previous Access Router within an IP hand-off request. The Reassociation Request is authenticated at the previous Access Router and the tunnelling of IP packets, received at the previous Access Router and destined for said Mobile Node, initiated towards said new Access Router.

Embodiments of the invention allow the tunnelling of IP packets between the old and the new Access Routers to commence immediately or at least shortly after authentication of the reassociation request has been carried out at the old Access Router.

Preferably, following receipt of said Reassociation Request at the new Access Router, a new Reassociation Request is sent from the new Access Router to the new Access point, the new Reassociation Request containing the MAC address of the Mobile Node as source address, and causing the new Access Point to send a Reassociation Response to the Mobile Node.

According to a preferred embodiment of the invention, said new Reassociation Request is sent at substantially the same time as said IP hand-off request. Said Access Routers operate as Mobility Access Gateways according to Proxy Mobile IP, on behalf of said Mobile Node, and said IP hand-off request is a Proxy Handoff Initiate message. At said new Access Router, a new Care-of-Address is allocated to said Mobile Node upon receipt of said Reassociation Request, and a Location Update message sent to a Home Agent of the Mobile Node.

Preferably, following completing of the MAC hand-off of the Mobile Node to the new Access Point, a new token is generated at the new Access Router and distributing the new token to neighbouring Access Routers within the WLAN domain including to replace the previously distributed token. The process of generating the new token may comprise repeating said step of sending a second Reassociation Request and calculating a hash value, this time between the Mobile Node and the new Access Router.

According to a second aspect of the present invention there is provided an Access Point for use within a WLAN domain and being attached in use to an Access Router of said domain, the Access Point being configured to receive an attachment request from a Mobile Node, to receive an authentication token for said Mobile Node from said Access Router following receipt of said request, to receive a reassociation request from said Mobile Node and to compute a token using the reassociation request, and to compare the computed token with the retrieved authentication token for the purpose of authenticating the mobile node.

According to a preferred embodiment, the Access Point is configured to contact said Access Router in order to retrieve said authentication token, and to compute said token by applying a hash function across all or part of said reassociation request. Preferably, the Access Point blanks the MAC destination address field of said reassociation request prior to computing said hash.

Preferably, the Access Point is configured to forward said reassociation request to said Access Router if the tokens match, to subsequently receive a reassociation request from the Access Router acting as MAC layer proxy on behalf of the Mobile Node, and to send an acknowledgement to the Mobile Node.

According to a third aspect of the present invention there is provided an Access Router configured in use to generate an authentication token for a wireless Mobile Node attached to the Access Router, to distribute the token to other Access Routers within the same WLAN domain, to subsequently receive from another of said Access Routers a Reassociation Request in respect of said Mobile node, to authenticate the request using said token, and upon authentication of the request to initiate the tunnelling of IP packets to that other Access Router.

Preferably, the Access Router is configured to generate said authentication token by applying a hash function to all or part of a Reassociation Request received from said Mobile Node, to receive an authentication token from another Access Router within the same WLAN domain, to cache that token together with a corresponding Mobile Node MAC address and, in the event that a further reassociation request is received from an Access Point attached to the Access Router, to authenticate the request by computing a token across the request and comparing it to the cached token. The cached token is deleted in the event that the computed token and the cached token match.

According to a fourth aspect of the present invention there is provided a Mobile Node comprising a WLAN interface and configured in use to attach to a first WLAN Access Point of a WLAN domain, the first WLAN Access Point being attached to a first WLAN Access Router of said domain, where said Mobile Node and said first Access Router possess a shared secret. A Reassociation Request is sent to said first Access Router via said first Access Point, the Reassociation Request containing a Message Integrity Code computed using said shared secret. The Mobile Node then attaches to a second WLAN Access Router within said WLAN domain, the second Access Point being attached to a second WLAN Access Router, and sends a further Reassociation Request containing said Message Integrity Code to said second Access Router via said second Access Point, whereby the second Access Point and/or second Access Router can authorise the Mobile Node based upon said further Reassociation Request.

According to a fifth aspect of the present invention there is provided a method of authenticating a Mobile Node to a new Access Point and/or Access Router of a WLAN domain at hand-off from a previous Access Point to the new Access Point, the method comprising:

following successful attachment of the Mobile Node to the previous Access Point, generating a token at the previous Access Router;

distributing the token to neighbouring Access Routers within the same WLAN domain and caching the token at those Access Routers;

upon receipt of a MAC Reassociation Request from the Mobile Node at the new Access Point and/or new Access Router, calculating a test token using the Request, comparing the test token with the previously distributed token, and, if the tokens match, considering the Reassociation Request to be authenticated.

DETAILED DESCRIPTION

The IETF working group known as NETLMM is currently working on the design of a fast mobility protocol for mobility unaware nodes, the design making use of Mobility Access Gateways (MAGs) which are typically co-located with Access Routers (ARs). It is proposed here to introduce into that design a mechanism whereby the mobile node (MN) provides the currently assigned AR with a "token", which is based on a re-association (rea) message. The token can be authenticated by the AR using a secret that is shares with the MN. The AR distributes this token to all neighbouring ARs (without sharing the secret) within the same WLAN domain. When the MN switches to a new AP under one of these neighbouring ARs, the new AP receives the rea message from the MN and can use this to compute the token. The new AP then fetches the token corresponding to this MN from its AR and compares the computed token with that received from the AR. If the tokens match, the new AP forwards the rea to the AR, which in turn triggers the IP-handoff. The AR also sends a re-association message to the new AP on behalf of the MN.

In describing the new fast mobility protocol, a number of assumptions are made here:

1. It is assumed that all links between ARs and between any AR and its AP(s) are secure and trusted.
2. It is assumed that the MN and the AR(s) are running SeND (described in IETF RFC 3971) or a similar protocol, which enables the two nodes to share a secret (called Kr) during the IP attachment phase.
3. An AR is able to perform a MAC layer proxy role with all its AP(s), and has a full knowledge of the surrounding APs which are potential destination targets for a MN when switching to a particular neighbouring AR.
4. MNs are "mobility unaware", and are therefore unable to make any useful contribution during the IP handoff procedure (in order to reduce handoff latency and prevent data packet loss). Moreover, the "mobility unaware" feature prevents the MN's from (locally) configuring any IPv6 address other than the home address (HoA). However, the MNs remain fully aware of mobility at the MAC layer.

Figure 1:
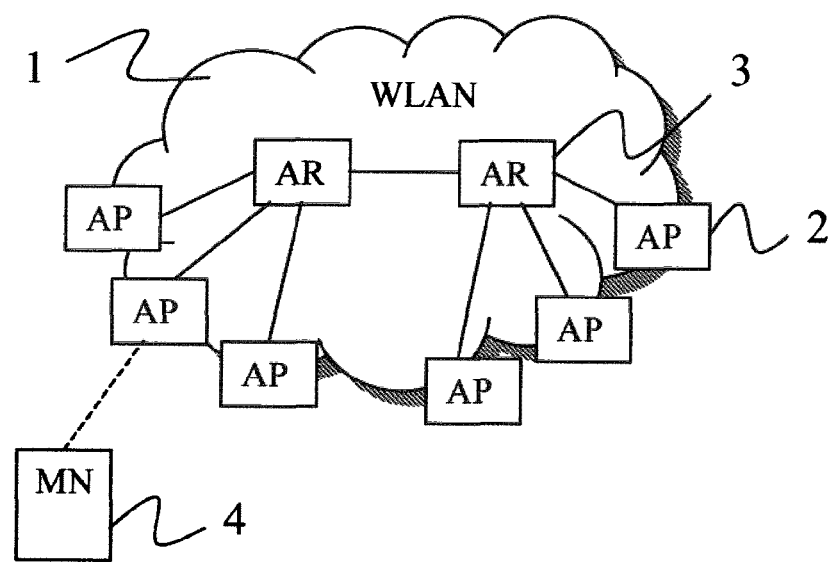
FIG. 1 illustrates schematically a WLAN network.
Figure 2:
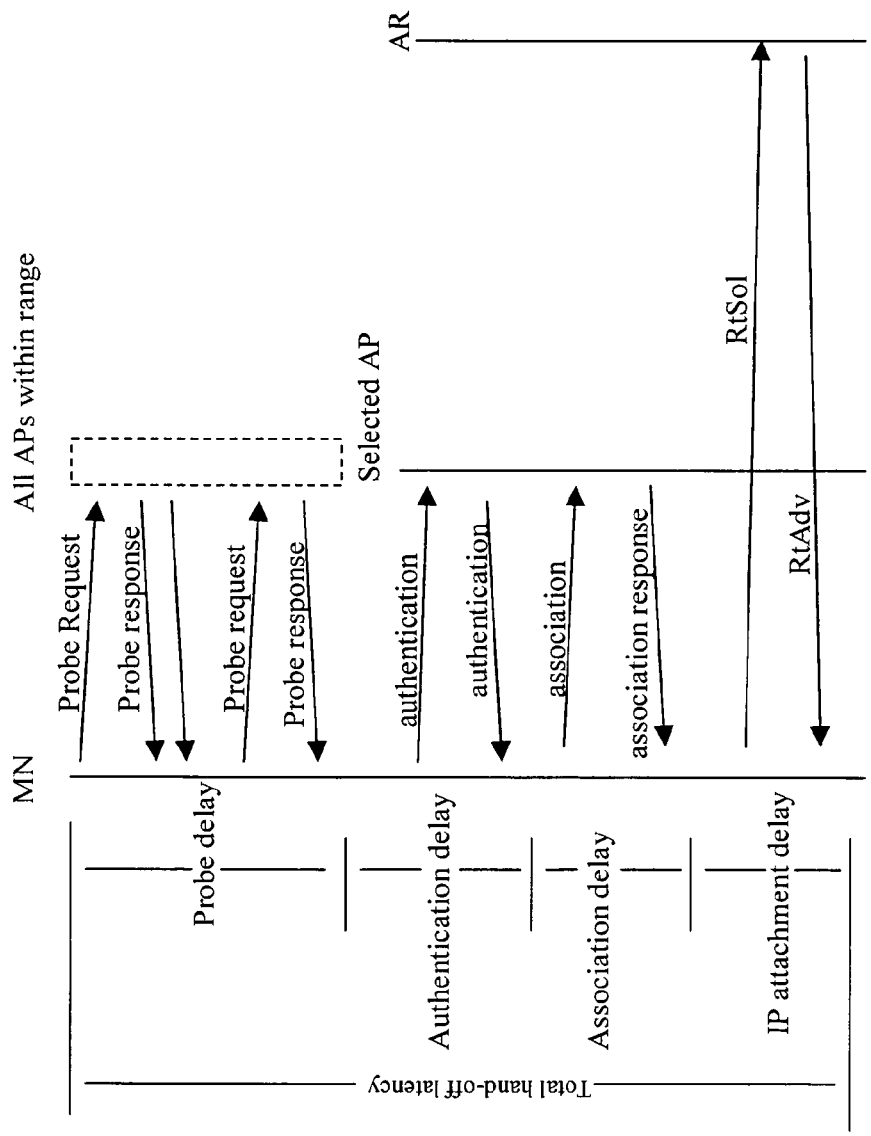
FIG. 2 illustrates a WLAN Access Point attachment procedure according to IEEE 802.11, as well as the subsequent IP attachment signalling.
Figure 3:
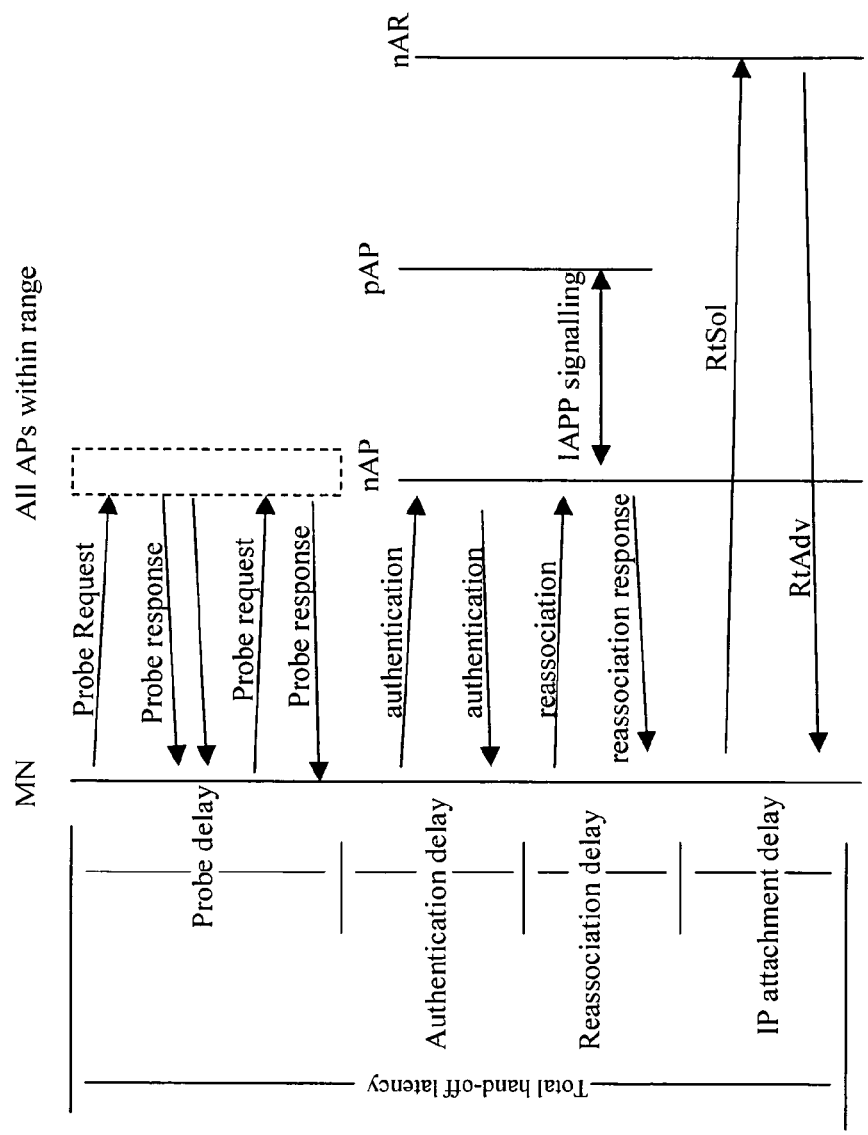
FIG. 3 illustrates a WLAN Access Point handoff procedure according to IEEE 802.11, as well as the subsequent IP attachment signalling.

Considering the handoff procedure in more detail, assume that a given user's device (MN) has both 3GPP and WLAN capabilities. When entering a WLAN domain from a 3GPP domain, as a result of authentication procedures between the WLAN and the user's home network (e.g. using the Extensible Authentication Protocol) the MN and the allocated AR will share a secret "Kr". The authentication and association procedures (as per FIG. 2) are completed, after which the IP attach is completed and a location update performed by the AR acting as MAG. The AR includes within a Proxy Router Advertisement (PrRtAdv, RFC 4069) message (more particularly within an option field) a list of "tuples" describing all potential destination APs, in terms of their SSIDs and MAC addresses, that are attached to neighbouring AR(s), and which are able to implement the fast handoff procedure.

Once all phases of the attachment have been completed, the MN constructs a reassociation request (rea). The rea contains the MN's MAC address as source address and an empty MAC destination address field, i.e. the destination address field contains all zeroes. The MN computes a Message Integrity Check (MIC) value across the message using the shared secret Kr, and inserts the first 128 bits of the MIC in the Frame body field of the rea. A preferred mechanism for inserting the MIC is to XOR the MIC with the contents of the Frame body field which, in the case of a rea, is normally empty. The rea is then sent confidentially to the AP, e.g. encrypted using the AR's public key, with the AP forwarding it transparently to the AR. The rea may be contained within the Neighbor Discover (ND) message (RFC 4861) which is signed by the MN. An appropriate flag within the ND message header identifies the message as containing an au-rea. According to the Fast MIPv6 specification, the rea may be sent within a Proxy RtSol message (PrRtSol).

Upon receiving the rea request, the AR verifies the MIC using its copy of Kr. Assuming that the message is verified correctly, the AR then computes a hash over the whole rea, referred to as a HAV value, and stores this in its cache memory, together with the MAC address and IPv6 address (allocated by the AR) of the MN. The AR then sends this three-element vector to all neighbouring ARs within an authenticated message. Each neighbouring AR stores the vector in its cache memory, together with the IPv6 address of the originating AR (i.e. the AR to which the MN is currently attached). This completes the set-up phase, and optimised handoffs can now be performed between ARs in the WLAN access domain.

Figure 4:
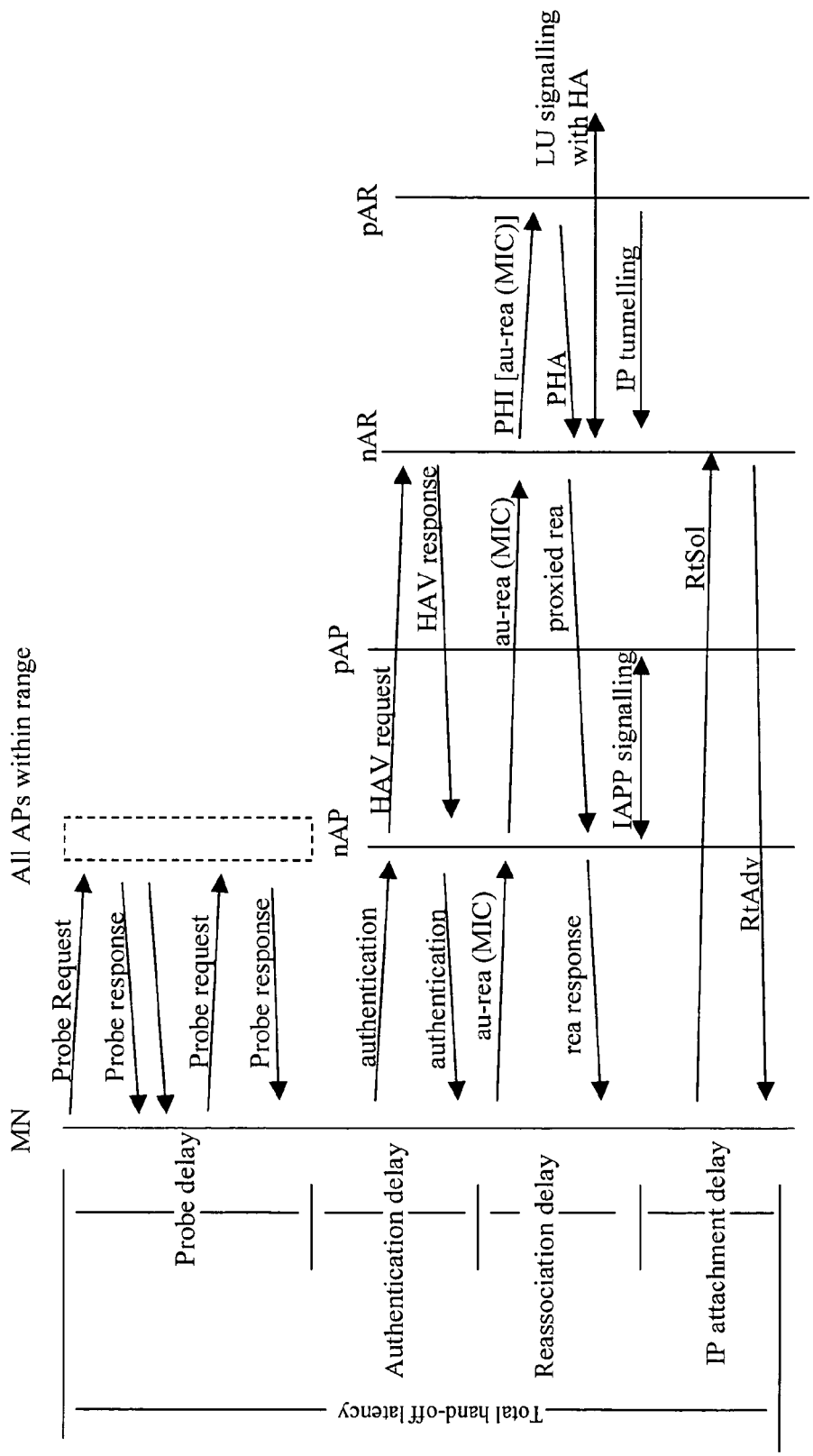
FIG. 4 illustrates a WLAN Access Point handoff procedure according to an embodiment of the present invention.

Assume now that a MN determines that a handover is required, and selects (using the probe exchange) a suitable new AP (nAP) which is attached to a new AR (nAR). The MN will be able to determine that the nAP is attached to a new AR by virtue of the MAC address of the nAP (this will have been included in the list of tuples received from the previous AR), and thus will know that an AR level handoff is required. As illustrated in FIG. 4, the MN sends a MAC authentication request to the nAP. Upon receipt, the nAP requests from the nAR a HAV corresponding to the MN's MAC address, and at the same time returns the MAC authentication response to the MN. The MN sends the au-rea request to the nAP (the only change being that the nAP's MAC address is inserted into the otherwise empty destination address field). In particular, the 128 bit MIC remains unchanged.

By the time the nAP receives the au-rea from the MN, it has already received the HAV from the AR and stored it in its cache memory. The nAP checks its cache memory to see if it contains a HAV corresponding to the MN's MAC address. In the case that a HAV is identified, the nAP replaces the destination MAC address of the au-rea with zeros and hashes the remaining message. It then compares the result with the HAV returned from its cache memory. This provides an early defence against attacks which replay au-rea requests previously sent by a MN.

Assuming that the HAV computed over the received au-rea matches the retrieved HAV, the nAP forwards the au-rea message to the nAR and clears the corresponding HAV from its cache memory. [If the two values are not equal the nAP discards the au-rea.] Upon receipt, the nAR repeats the process of computing the HAV across the message (with the destination MAC address field blanked) and comparing it against its cached HAV. This re-checking procedure protects the AR against a compromised AP. In the event that the HAVs match, the nAR deletes the HAV from its cache memory and forwards the au-rea to the pAR, for example by inserting it into a Proxy Handoff Initiate (PHI) message. This operation triggers the IP handoff procedure.

Upon receipt of the au-rea message from the nAR, the pAR checks the validity of the message based upon the MIC and Kr, and then starts tunneling data packets to the nAR. The pAR may also reply to the nAR with a Proxy Handoff Answer (PHA) message.

Considering further the steps carried out at the nAR, as soon as the nAR has received the au-rea and confirmed that the HAV's match, it sends a new rea to the nAP on behalf of the MN (e.g. using the Layer 2 Tunneling Protocol) at substantially the same time as it sends the au-rea to the pAR. The new rea contains the MN's MAC address as source address so that the nAP can associate the MN and send an acknowledge message (that is rea-response) to the MN (using its MAC address). This new rea does contains an empty Frame body field, as per a normal rea request. At this point, an appropriate IAPP is run between the nAP and the pAP in order to delete the MN's MAC address from the tables held by the pAP.

At this point the MN initiates the link layer authentication (e.g., as required by IPv6) and receives a RtAdv message allowing it to re-configure its home IPv6 address. Of course, in the case where the AR acts as a MAG, the RtAdv will include the prefix of the MN's home network, and no address reconfiguration will be required at the MN. By the time that this process is completed, packets are already being tunneled from the pAR to the nAR and can be forwarded immediately to the MN via the nAP.

As already noted, following a first successful hand-off of the MN, the HAV value is deleted from the cache memories of the nAP and the nAR. In the event that an attacker tries to replay the au-rea request to the nAR, the nAR will not possess, or be able to obtain from the nAR, the HAV corresponding to the MAC. The request will therefore be discarded by the nAR. In the event that an attacker attempts to replay the au-rea to a different new AP (nAP'), the nAP' will be able to obtain the HAV from its AR (nAR'), assuming that nAR' is not the same as nAR. Hand-off will proceed until the pAR receives the au-rea from the nAR' (the HAV is associated at the nAR' with the IPv6 address of the pAR), whereupon the pAR will be unable to process the hand-off request as a hand-off has already been performed to nAR. The request will therefore be rejected.

In order to allow further valid hand-offs to be performed from the nAP, e.g. to nAP', following completion of the hand-off to nAP, the MN will send a second au-rea message to the nAP as shown in FIG. 4. This is secured with a new key Kr' (negotiated between the MN and the nAR) using, for example, the SeND protocol and again contains a blank MAC destination address field. The second au-rea is received by the nAR and the process described above with reference to the pAR, i.e. generation of the three element vector [HAV', MN MAC address, MN IPv6 address] and distribution of the vector together with the IPv6 address of the nAR to all neighbouring ARs within the same WLAN domain. Upon receipt of this new information, the peer ARs replace the currently stored data for the MN with the new data.

It will be appreciated that the hand-off preparation phase occurs some time after the actual hand-off phase has been completed, and is not time critical (as a further hand-off is unlikely to occur for some time). When such a further hand-off does occur, the process repeats, with this time the nAP' and nAR' verifying the new au-rea against HAV', and the nAR' sending the hand-off request to the nAR. Thus, each time a MN is handed-off to a new AP under a new AR, a new HAV is distributed to the ARs within the same WLAN domain to allow those ARs and the associated APs to subsequently perform a quick check on hand-off requests.

Figure 5:
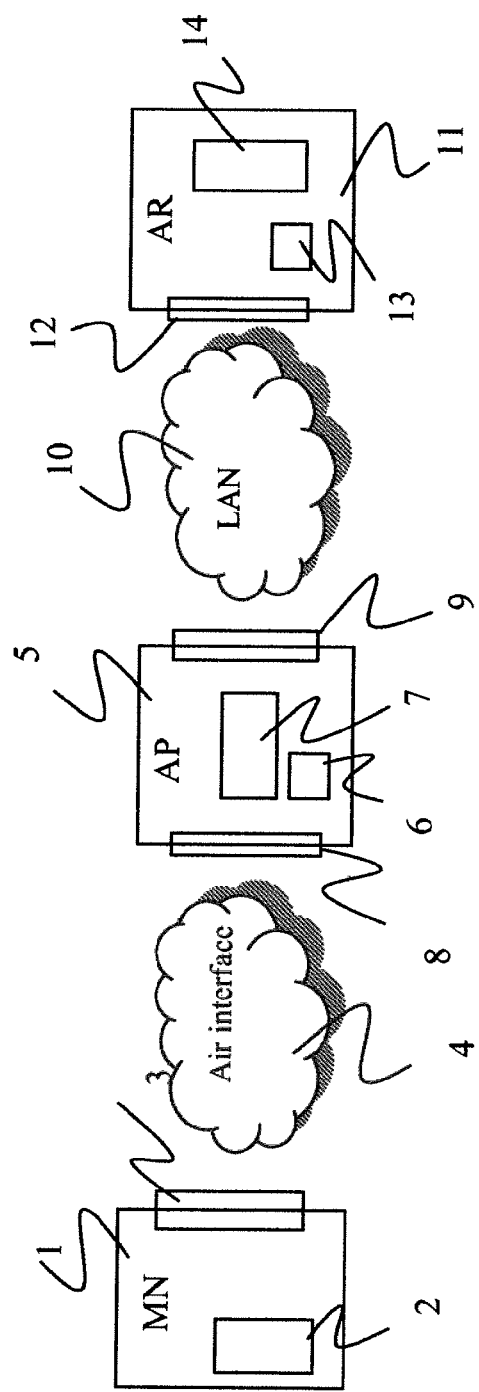
FIG. 5 illustrates schematically a number of nodes present within a WLAN domain, and certain functional components contained within these nodes.

FIG. 5 illustrates schematically various nodes within the WLAN domain and their functional components. A MN 1 comprises a memory 2 and a WLAN interface 3 that allows it to communicate with the WLAN over an air interface 4. An AP 5 comprises a processor 6 and memory 7, as well as a WLAN interface 8 and a LAN interface 9 for coupling the AP to a LAN 10. An AR 11 comprises a LAN interface 12, and a processor 13 and memory 14. In use, the memory 13 of the AR stores MN MAC addresses and corresponding HAVs (either generated within the AR or supplied by a peer AR), whilst the processor 12 calculates and compares HAVs. The memory 7 of the AP 5 temporarily stores HAV values requested and received from the AR 11, whilst the processor 6 computes and compares HAVs. The memory 2 of the MN is arranged to store tuples (MAC addresses of APs to which handover is possible).

It will be appreciated by those of skill in the art that various modifications may be made to the above described embodiments without departing from the scope of the present invention.

The invention claimed is:

1. A method of performing hand-off of a Mobile Node from a previous Access Point to a new Access Point within a WLAN domain, where the previous and new Access Points are connected respectively to previous and new Access Routers, the method comprising:
following a MAC authentication exchange between the Mobile Node and the new Access Point, receiving, at the New Access Point, a MAC Reassociation Request from the Mobile Node;
forwarding said Reassociation Request to said new Access Router, and sending the Reassociation Request from said new Access Router to said previous Access Router within an IP hand-off request;
following receipt of said Reassociation Request at the new Access Router, sending a new Reassociation Request from the new Access Router to the new Access point, the new Reassociation Request containing the MAC address of the Mobile Node as a source address, and causing the new Access Point to send a Reassociation Response to the Mobile Node; and
authenticating the Reassociation Request at the previous Access Router and initiating the tunneling of IP packets received at the previous Access Router and destined for said Mobile Node, towards said new Access Router.

2. A method according to claim 1, wherein said Access Routers operate as Mobility Access Gateways according to Proxy Mobile IP, on behalf of said Mobile Node, the method comprising, at said new Access Router, allocating a new Care-of-Address to said Mobile Node upon receipt of said Reassociation Request, and sending a Location Update message to a Home Agent of the Mobile Node.

3. A method according to claim 1, and comprising authenticating the Reassociation Request at the previous Access Router using a secret key shared between the previous Access Router and the Mobile Node.

4. A method according to claim 1, and comprising authenticating said Reassociation Request sent by the Mobile Node, at one or both of the new Access Point and the new Access Router.

5. A method according to claim 4 and comprising, following successful attachment of the Mobile Node to said previous Access Point and prior to hand-off to the new Access Point, generating and distributing a token to neighboring Access Routers within the WLAN domain including said new Access Router, and, subsequently, performing said step of authenticating said Reassociation Request sent by the Mobile Node at one or both of the new Access Point and the new Access Router using said token.

6. A method according to claim 5 and comprising, upon receiving a MAC Reauthentication Request at the new Access Point, sending a request for a token associated with the MAC address of the Mobile Node, from the new Access Point to the new Access Router and, if the new Access Router possesses such a token, sending it to the new Access Point and caching it there.

7. A method according to claim 5 and comprising, following a successful authentication of the Reassociation Request at one or both of the new Access Point and new Access Router, deleting said token from the memory cache(s).

8. A method according to claim 7 and comprising, authenticating the Reassociation Request at the previous Access Router using a secret key shared between the previous Access Router and the Mobile Node, and, following successful attachment of the Mobile Node to said previous Access Point and prior to hand-off to the new Access Point, receiving, at the previous Access Router, a second Reassociation Request from the Mobile Node, the message having an empty MAC destination address field and containing a Message Integrity Check value calculated using said shared secret, said step of generating a token at the previous Access Router comprising calculating a hash value across the second Reassociation Request, and said step of authenticating said Reassociation Request at one or both of the new Access Point and the new Access Router comprising blanking the MAC destination address field of the Reassociation Request and calculating said hash value across the resulting message, and comparing the value against the distributed hash value.

9. An Access Point for use within a WLAN domain and being attached in use to an Access Router of said domain, the Access Point being configured to:
receive an attachment request from a Mobile Node;
receive an authentication token for said Mobile Node from said Access Router following receipt of said request;
receive a Reassociation Request from said Mobile Node;
compute a token using the Reassociation Request from;
compare the computed token with the retrieved authentication token for the purpose of authenticating the mobile node; and
forward said Reassociation Request to said Access Router if the tokens match.

10. An Access Point according to claim 9 and being configured to contact said Access Router in order to retrieve said authentication token.

11. An Access Point according to claim 9, said token being retrieved from said Access Router using the MAC address of the Mobile Node as a lookup key.

12. An Access Point according to claim 9 and configured to compute said token by applying a hash function across all or part of said Reassociation Request.

13. An Access Point according to claim 12 and configured to blank the MAC destination address field of said Reassociation Request prior to computing said hash.

14. An Access Point according to claim 9 and configured to subsequently receive a Reassociation Request from the Access Router acting as MAC layer proxy on behalf of the Mobile Node, and to send an acknowledgement to the Mobile Node.

15. An Access Point according to claim 9 and arranged to exchange signaling with an Access Point with which said Mobile Node was previously attached in order to cause the previous Access Router to update its MAC address table.

16. An Access Point according to claim 9 and configured to delete said token from a memory cache, following a successful authentication of the Mobile Node.

17. An Access Router for use within a WLAN domain and being configured in use to:
- generate an authentication token for a wireless Mobile Node attached to the Access Router;
- distribute the token to other Access Routers within the same WLAN domain;
- subsequently receive from another of said Access Routers a Reassociation Request in respect of said Mobile node;
- authenticate the request using said token, and upon authentication of the request, initiate the tunneling of IP packets to that other Access Router;
- receive an authentication token from another Access Router within the same WLAN domain;
- cache the received authentication token together with a corresponding Mobile Node MAC address; and
- in the event that a further Reassociation Request is received from an Access Point attached to the Access Router, authenticate the request by computing a token across the request and comparing it to the cached token.

18. An Access Router according to claim 17 and configured to generate said authentication token by applying a hash function to all or part of a Reassociation Request received from said Mobile Node.

19. An Access Router according to claim 17 and configured to delete the cached token in the event that the computed token and the cached token match.

20. A method of authenticating a Mobile Node to a new Access Point and/or Access Router of a WLAN domain at hand-off from a previous Access Point to the new Access Point, the method comprising:
- following successful attachment of the Mobile Node to the previous Access Point, generating a token at the previous Access Router;
- distributing the token to neighboring Access Routers within the same WLAN domain and caching the token at those Access Routers;
- upon receipt of a MAC Reassociation Request from the Mobile Node at one or both of the new Access Point and new Access Router, calculating a test token using the Request, comparing the test token with the previously distributed token, and, if the tokens match, considering the Reassociation Request to be authenticated.

* * * * *

UNITED STATES PATENT AND TRADEMARK OFFICE
CERTIFICATE OF CORRECTION

PATENT NO. : 8,442,006 B2
APPLICATION NO. : 12/743694
DATED : May 14, 2013
INVENTOR(S) : Haddad et al.

Page 1 of 1

It is certified that error appears in the above-identified patent and that said Letters Patent is hereby corrected as shown below:

On the Title Page

Item (73), under "Assignee", in Column 1, Line 1, delete "Ericsson," and insert -- Ericsson (publ), --, therefor.

Item (57), under "ABSTRACT", in Column 2, Line 8, delete "New Access" and insert -- new Access --, therefor.

In the Specification

In Column 9, Line 5, delete "memory 13" and insert -- memory 14 --, therefor.

In the Claims

In Column 9, Line 35, in Claim 1, delete "point," and insert -- Point, --, therefor.

In Column 11, Line 8, in Claim 17, delete "node;" and insert -- Node; --, therefor.

Signed and Sealed this
Thirty-first Day of December, 2013

Margaret A. Focarino
*Commissioner for Patents of the United States Patent and Trademark Office*